C. H. KNAPP.
HAY-LOADER.
No. 176,009. Patented April 11, 1876.
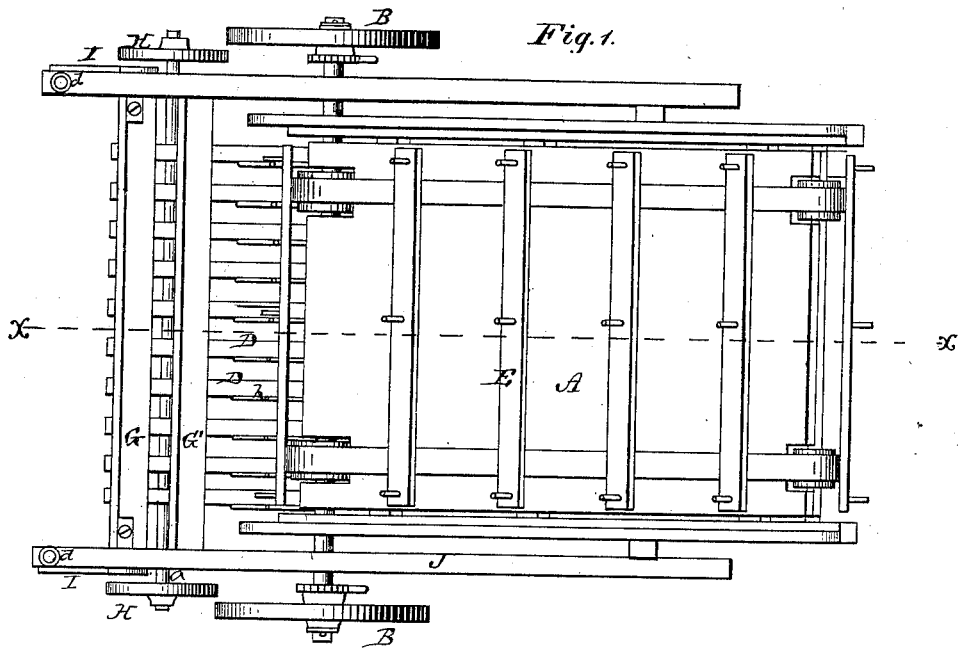
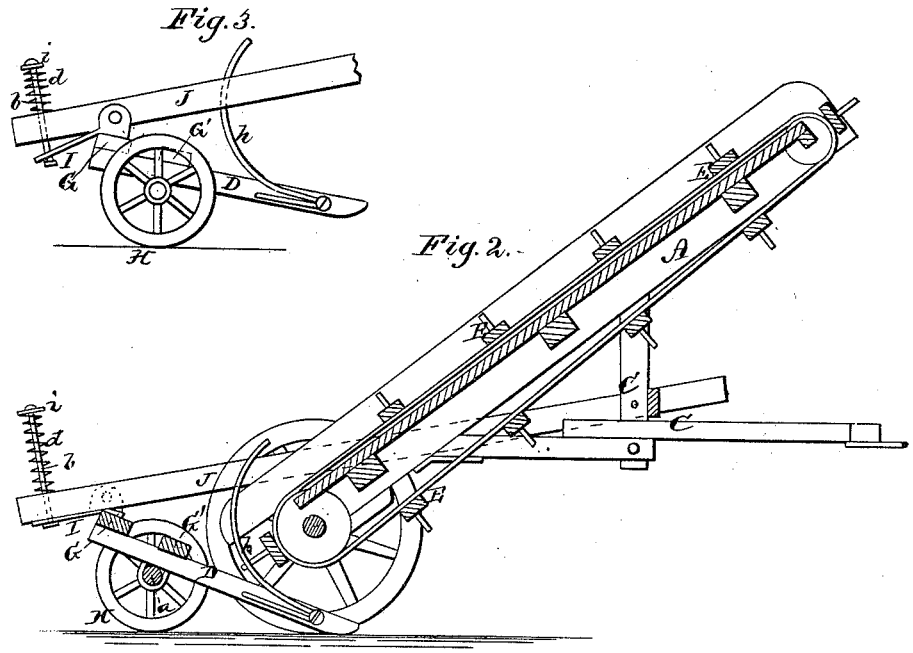
WITNESSES
Henry N. Miller
C. L. Evert
INVENTOR
Chas. H. Knapp
By Mason & Hasson
Attorneys

UNITED STATES PATENT OFFICE.

CHARLES H. KNAPP, OF FREEPORT, ILLINOIS.

IMPROVEMENT IN HAY-LOADERS.

Specification forming part of Letters Patent No. 176,009, dated April 11, 1876; application filed November 5, 1875.

*To all whom it may concern:*

Be it known that I, C. H. KNAPP, of Freeport, in the county of Stephenson and in the State of Illinois, have invented certain new and useful Improvements in Hay and Grain Rake and Loader Combined; and do hereby declare that the following is a full, clear, and exact description thereof, reference being had to the accompanying drawing, and to the letters of reference marked thereon, making a part of this specification.

The nature of my invention consists in the construction and arrangement of a combined hay and grain rake and loader, as will be hereinafter more fully set forth.

In order to enable others skilled in the art to which my invention appertains to make and use the same, I will now proceed to describe its construction and operation, referring to the annexed drawing, in which—

Figure 1 is a plan view of my invention. Fig. 2 is a longitudinal vertical section of the same. Fig. 3 is a detached view of a part thereof.

A represents an elevator-frame, mounted upon wheels B B at its lower end, and provided with suitable frame-work and connections C C on its under side, to be coupled to the hind end of a wagon in any of the known and usual ways. E is the usual endless elevator for carrying up the hay or grain from the rake and depositing it on the wagon. The rake is constructed of a series of wooden teeth or pointed bars, D D, attached to the under sides of two parallel cross-bars, G G', and mounted upon an axle, $a$, and wheels H H. On each end of the rear bar G is secured a bracket, I, extending a suitable distance in rear thereof. To the front end of each bracket I is hinged or pivoted a bar or lever, J, the front end of which is adjustably connected to the frame C under the elevator, and passing backward over the axle of the elevator. From the rear end of each bracket I extends a pin or rod, $b$, upward through a hole in the rear end of the bar J, and the upper end of said pin or rod is provided with a head, $i$, or its equivalent. Between this head and the bar J is a spiral spring, $d$, surrounding the pin or rod $b$. These springs hold the teeth down to the ground, and allow the teeth to yield to any unevenness therein. On the side of each rake-tooth D is fastened a wire-spring, $h$, which is curved upward, as shown in Figs. 2 and 3, and which spring is for the purpose of passing the hay or grain against the elevator-carriers, thereby enabling the carrier to take the hay or grain from the rake more perfectly.

It will be noticed in the construction of this machine that the rake and elevator each rests upon wheels, independent of the other, and that the rake adjusts and adapts itself to an uneven surface without any labor on the part of the operator.

Having thus fully described my invention, what I claim as new, and desire to secure by Letters Patent, is—

The combination of the bars or levers J J, each provided at its rear end with a headed pin, $b$, and spring $d$, the brackets I I connected to the headed pins, and connecting the levers J to the cross-bar, to which the rake-teeth are attached, by hinged joint, all substantially as and for the purposes herein set forth.

In testimony that I claim the foregoing I have hereunto set my hand this 18th day of October, 1875.

C. H. KNAPP.

Witnesses:
Z. M. HIBBARD,
R. F. HAYES,
ALEX. ROSS.